United States Patent [19]

Nawaz

[11] Patent Number: 4,596,621
[45] Date of Patent: Jun. 24, 1986

[54] METHOD OF MAKING A COMPOSITE BOND CASCADE FOR A THRUST REVERSER UNIT OF AN AIRCRAFT ENGINE NACELLE

[75] Inventor: Saeed A. Nawaz, Wichita, Kans.

[73] Assignee: The Boeing Company, Seattle, Wash.

[21] Appl. No.: 567,771

[22] Filed: Jan. 3, 1984

[51] Int. Cl.⁴ ............................................. B32B 31/04
[52] U.S. Cl. ................................ 156/245; 244/110 B
[58] Field of Search ............... 156/155, 178, 179, 180, 156/173, 245, 433, 434; 244/110 B

[56] References Cited

U.S. PATENT DOCUMENTS

| 3,772,126 | 11/1973 | Myers | 156/180 |
| 4,173,307 | 11/1979 | Ittner | 244/110 B |
| 4,278,220 | 7/1981 | Johnston et al. | 244/110 B |
| 4,460,531 | 7/1984 | Harris et al. | 156/245 |

Primary Examiner—Caleb Weston
Attorney, Agent, or Firm—Edwin H. Crabtree

[57] ABSTRACT

A composite bond cascade for a thrust reverser unit of an aircraft engine nacelle and a method of making the cascade. The cascade made of continuous fibers used in forming vanes and beams of the cascade for reducing weight and improving the overall strength of the cascade.

2 Claims, 3 Drawing Figures

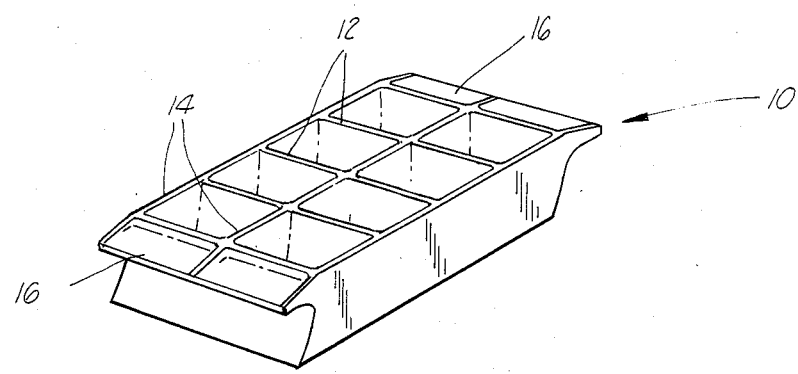
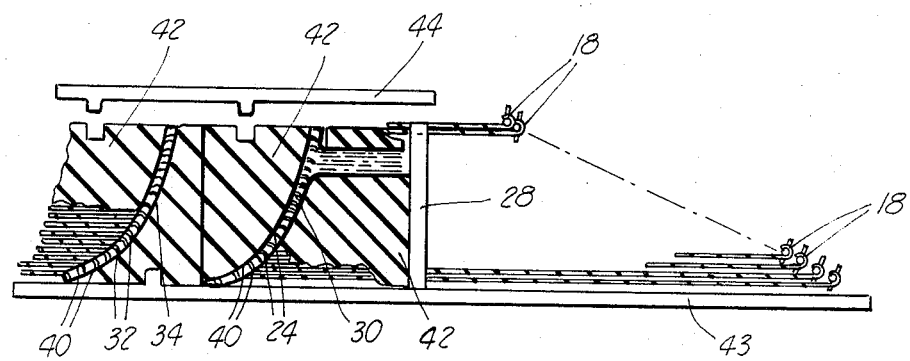
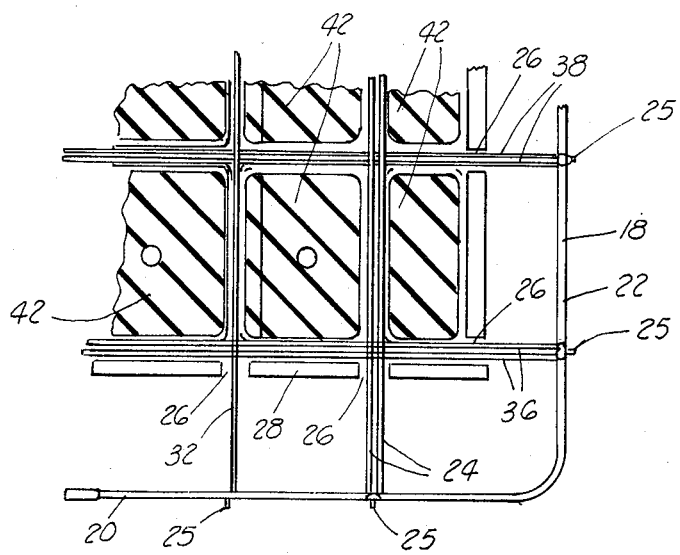
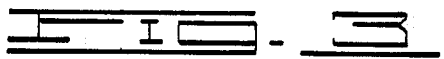

METHOD OF MAKING A COMPOSITE BOND CASCADE FOR A THRUST REVERSER UNIT OF AN AIRCRAFT ENGINE NACELLE

BACKGROUND OF THE INVENTION

This invention relates to a cascade assembly and more particularly but not by way of limitation to a cascade with reinforced continuous load carrying fibers for a thrust reverser unit in an aircraft engine nacelle.

Heretofore, cascades used in a thrust reverser unit have been made up of metal castings or composite material made of chopped fibers in a plastic matrix and injection molded. The injection molded cascades have not been found to be strong enough and have had to be supported by additional structure.

In the following United States Patents, U.S. Pat. No. 4,067,094 to Ittner, U.S. Pat. No. 4,173,307 to Ittner and U.S. Pat. No. 4,278,220 to Johnston et al different types of thrust reverser units have been disclosed having cascade assemblies. None of these prior art thrust reverser units include the unique features and advantages of the subject composite bond cascade as described herein.

SUMMARY OF THE INVENTION

The subject composite bond cascade for a thrust reverser unit of an aircraft engine nacelle reduces the overall weight of a standard cascade by 12% or more when compared to materials such as magnesium which were used in standard cascade construction.

Further, by aligning the continuous fibers in the direction of the maximum loads on the cascade, overall strength of the cascade has been greatly improved.

The composite bond cascade includes a plurality of continuous fibers stacked one on top of the other with the fibers forming continuous parallel vanes with additional fibers stacked one on top of the other forming intersecting beams of the cascade. The continuous fibers are coated with an epoxy material along with a coated fabric inserted along and around the sides of the vanes and walls. The structure is heated and cured forming the composite bond cascade.

The advantages and objects of the invention will become evident from the following detailed description of the drawings when read in connecting with the accompanying drawings which illustrate preferred embodiments of the invention.

BRIEF DESCRIPTION OF THE DRAWINGS

FIG. 1 illustrates the completed composite bond cascade specimen.

FIG. 2 is a partial side sectional view of the cascade with a metal tool mold and rectangular frames.

FIG. 3 is a partial top view of the cascade and tool mold shown in FIG. 2.

DETAILED DESCRIPTION OF THE DRAWINGS

In FIG. 1 a completed composite bond cascade specimen is shown and designated by general reference numeral 10. The cascade 10 includes a plurality of vanes 12 and intersecting beams 14 with a pair of flanges 16 at opposite ends of the cascade 10.

Referring now to FIGS. 2 and 3 a plurality of metal frames 18 are stacked one on top of the other and used to form the cascade 10. The metal frames 18 include sides 20 and ends 22. The opposite side 20 and opposite end 22 are not shown in the drawings. A continuous first fiber 24 is attached to a tab 25 on the sides 20 of the frame 18. The fiber 24 is then placed through an opening 26 in a metal tool mold 28. The continuous fibers 24 are stacked one on top of the other as shown in FIG. 2, to form the desired cuvature of a vane 30. Second continuous fibers 32 are disposed in a spaced relationship from the first fibers 26 on the frame 18 and again stacked one on top of the other and placed through one of the openings 26 in the tool mold 28 for forming an adjacent vane 34 in a desired geometric configuration.

Using third continuous fibers 36 and attaching the fibers 36 to the end 22 of the frame 18, the third fibers 36 are extended through the openings 26 in the mold 28 and weaved through the first and second fibers with the third fibers 36 stacked one on top of the other forming an intersecting beam. Likewise, fourth fibers 38 parallel to the third fibers 36 are attached to the frame 18 and weaved through the first and second fibers forming an adjacent beam.

In operation the fibers may be of a kevlar epoxy impregnated yarn, graphite yarn and the like. When the fibers are compressed on top of each other forming the beams 14 and vanes 12 of the cascade 10, using the frames 18, the sides of the beams 14 and vanes 12 receive a graphite fabric 40 which is compressed against the sides of the beams 14 and vanes 12 by plugs 42. The plugs 42 are shaped to fill the cavity formed between the vanes 12 and beams 14. A fiberglass fabric and graphite fabric is also used to lay-up the flanges 16 of the cascade 10.

After the cascade 10 has been properly formed using the frames 18 to form the vanes 12 and beams 14, a bleeder cloth is placed on top of the tool mold 28 to draw any excess epoxy as the cascade is heated and cured. The mold 28 is received on top of a flat bottom plate 43 and enclosed by a top plate 44. When the mold 28 has been completely enclosed the mold is heated and the cascade 10 is allowed to curve. The plugs 42 which are treated with a parting or release agent are removed and the excess material is machined off.

Through the above mentioned method of weaving the continuous epoxy coated fibers to form the vanes and beams of the cascade 10, the cascade 10 is formed with continuous load carrying fibers aligned in the direction of maximum loads placed thereon.

Changes may be made in the construction and arrangement of the parts or elements of the embodiments as described herein without departing from the spirit or scope of the invention defined in the following claims.

What is claimed is:

1. A method of making a composite bond cascade made up of a plurality of parallel vanes and intersecting beams, the steps including:
    using a plurality of angular metal frames stacked one on top of the other;
    inserting the frames around a metal tool mold, the mold having an opened top and bottom and openings in the sides and ends of the mold;
    securing continuous first fibers on one side of the frame and extending the first fibers through the openings in the sides of the mold across to the opposite sides of the frame and securing the first fibers thereto, the first fibers disposed one on top of the other forming a wall of the vane;
    securing continuous fibers on one side of the frames with the second fibers disposed in a spaced relationship from the first fibers and extending the second fibers through the opening in the sides of the mold across to the opposite sides of the frame and securing the second fibers thereto, the second fibers forming a wall of an adjacent vane;

securing continuous third fibers on one end of the frames and extending the third fibers through the openings in the ends of the mold across to the opposite ends of the frame and securing the fibers thereto, the third fibers forming a wall of a beam;

securing continuous fourth fibers on one end of the frames and extending the fourth fibers through the openings in the ends of the mold across to the opposite ends of the frame and securing the fibers thereto, the fourth fibers forming a wall of an adjacent beam;

inserting a fabric around and along the sides of the parallel vanes and intersecting beams;

inserting a plug to fill the cavity between the first and second fibers and the third and fourth fibers; and heating and curing the fibers and removing the plug therefrom.

2. The method as described in claim 1 further including the step of enclosing the tool mold with a top and bottom plate prior to heating and curing the fibers.

* * * * *